US008978449B2

(12) United States Patent
Johnson, Sr.

(10) Patent No.: US 8,978,449 B2
(45) Date of Patent: Mar. 17, 2015

(54) STRUCTURALLY ENHANCED PLASTICS WITH REINFORCEMENTS

(71) Applicant: Ecopuro, LLC, Denver, CO (US)

(72) Inventor: William L. Johnson, Sr., Grove, OK (US)

(73) Assignee: Ecopuro, LLC, Denver, CO (US)

( * ) Notice: Subject to any disclaimer, the term of this patent is extended or adjusted under 35 U.S.C. 154(b) by 0 days.

(21) Appl. No.: 14/292,424

(22) Filed: May 30, 2014

(65) Prior Publication Data

US 2014/0273758 A1    Sep. 18, 2014

Related U.S. Application Data

(60) Continuation of application No. 13/757,322, filed on Feb. 1, 2013, which is a division of application No. 12/572,942, filed on Oct. 2, 2009, now abandoned, which is a continuation-in-part of application No. 12/412,357, filed on Mar. 26, 2009, now abandoned.

(60) Provisional application No. 61/070,876, filed on Mar. 26, 2008.

(51) Int. Cl.
*G01N 33/20* (2006.01)
*B24C 1/08* (2006.01)
(Continued)

(52) U.S. Cl.
CPC ............... *B24C 1/08* (2013.01); *B29C 47/0877* (2013.01); *B29B 7/002* (2013.01); *B29B 7/80* (2013.01);
(Continued)

(58) Field of Classification Search
USPC .................. 73/61.41, 61.71; 702/50; 524/495
See application file for complete search history.

(56) References Cited

U.S. PATENT DOCUMENTS

| 4,046,849 A | 9/1977 | Lever et al. |
| 4,211,687 A | 7/1980 | Salee |

(Continued)

FOREIGN PATENT DOCUMENTS

| EP | 1514008 | 3/2005 |
| EP | 1563983 | 8/2005 |

(Continued)

OTHER PUBLICATIONS

Carberry, James J., "A Boundary-Layer Model of Fluid-Particle Mass Transfer in Fixed Beads," A.I.Ch. E. Journal, Sep. 1960, pp. 460-462.*

(Continued)

*Primary Examiner* — Kara Boyle
(74) *Attorney, Agent, or Firm* — Fellers, Snider, Blankenship, Bailey & Tippens, P.C.

(57) ABSTRACT

A composition comprising a fluid, and a material dispersed in the fluid, the material made up of particles having a complex three dimensional surface area such as a sharp blade-like surface, the particles having an aspect ratio larger than 0.7 for promoting kinetic boundary layer mixing in a non-linear-viscosity zone. The composition may further include an additive dispersed in the fluid. The fluid may be a thermopolymer material. A method of extruding the fluid includes feeding the fluid into an extruder, feeding additives into the extruder, feeding a material into the extruder, passing the material through a mixing zone in the extruder to disperse the material within the fluid wherein the material migrates to a boundary layer of the fluid to promote kinetic mixing of the additives within the fluid, the kinetic mixing taking place in a non-linear viscosity zone.

29 Claims, 5 Drawing Sheets

Velocity is zero at the surface (no – slip)

(51) Int. Cl.
  *B29C 47/08* (2006.01)
  *B29B 7/00* (2006.01)
  *B29B 7/80* (2006.01)
  *B29C 47/60* (2006.01)
  *B24C 11/00* (2006.01)
  *B29C 47/00* (2006.01)
  *B29K 105/00* (2006.01)
  *B29K 105/12* (2006.01)
  *B29K 105/16* (2006.01)

(52) U.S. Cl.
  CPC ........... *B29C 47/6018* (2013.01); *B24C 11/005* (2013.01); *B29C 47/0011* (2013.01); *B29C 47/003* (2013.01); *B29C 47/0057* (2013.01); *B29K 2105/0032* (2013.01); *B29K 2105/12* (2013.01); *B29K 2105/16* (2013.01); *B29K 2105/251* (2013.01)
  USPC ............ 73/61.41; 73/61.71; 702/50; 524/495

(56) References Cited

U.S. PATENT DOCUMENTS

| | | | |
|---|---|---|---|
| 4,442,242 | A | 4/1984 | Fogelberg |
| 4,686,253 | A | 8/1987 | Struss et al. |
| 5,010,130 | A | 4/1991 | Chapman, Jr. et al. |
| 5,026,512 | A | 6/1991 | Chang |
| 5,030,662 | A | 7/1991 | Banerjie |
| 5,393,536 | A | 2/1995 | Brandt et al. |
| 5,445,754 | A | 8/1995 | Nelson |
| 5,945,478 | A | 8/1999 | Buckmaster et al. |
| 5,948,845 | A | 9/1999 | Good et al. |
| 6,464,770 | B1 * | 10/2002 | Palm et al. .................... 106/409 |
| 6,489,019 | B1 | 12/2002 | Shah et al. |
| 6,565,779 | B1 | 5/2003 | Kharazi |
| 6,656,877 | B2 | 12/2003 | Sughrue et al. |
| 6,921,789 | B2 | 7/2005 | Booth et al. |
| 7,307,121 | B2 | 12/2007 | Zhang et al. |
| 7,358,293 | B2 | 4/2008 | Agarwal |
| 7,763,341 | B2 | 7/2010 | Brown |
| 2003/0127022 | A1 | 7/2003 | Palm et al. |
| 2003/0153669 | A1 | 8/2003 | Brother et al. |
| 2004/0054056 | A1 | 3/2004 | Barber et al. |
| 2005/0113492 | A1 | 5/2005 | Bayer et al. |
| 2005/0137315 | A1 | 6/2005 | Aksay et al. |
| 2006/0004154 | A1 | 1/2006 | DeRudder et al. |
| 2006/0012074 | A1 | 1/2006 | Booth et al. |
| 2006/0075930 | A1 | 4/2006 | Wang et al. |
| 2007/0048527 | A1 | 3/2007 | Agarwal et al. |
| 2007/0078191 | A1 | 4/2007 | Guhde et al. |
| 2007/0082997 | A1 | 4/2007 | Pfau et al. |
| 2007/0100077 | A1 | 5/2007 | Lavanga et al. |
| 2007/0135589 | A1 | 6/2007 | DeRudder et al. |
| 2007/0164466 | A1 | 7/2007 | Scherzer et al. |
| 2007/0222106 | A1 | 9/2007 | Brown |
| 2008/0015290 | A1 | 1/2008 | Siripurapu et al. |
| 2008/0064812 | A1 | 3/2008 | Narayan et al. |
| 2008/0227896 | A9 | 9/2008 | Ebeling et al. |
| 2009/0107230 | A1 * | 4/2009 | Okcay et al. ................ 73/148 |

FOREIGN PATENT DOCUMENTS

| | | |
|---|---|---|
| GB | 1418642 | 12/1975 |
| GB | 2143838 | 2/1985 |
| WO | WO9938915 | 8/1999 |
| WO | WO0073370 | 12/2000 |
| WO | WO0183371 | 11/2001 |
| WO | WO0211882 | 2/2002 |
| WO | WO2006101440 | 9/2006 |
| WO | WO2008079438 | 7/2008 |
| WO | WO2009132361 | 10/2009 |

OTHER PUBLICATIONS

European Patent Office, "International Search Report for PCT/US2009/045180", Feb. 11, 2010.

European Patent Office, "International Search Report for PCT/US2011/043764", Oct. 10, 2011.

Lee et al., "Breakthrough Polymer Finishing Technology: Manufacturing Productivity and Polymer Performance Enhancements", www.vitroco.com, Jan. 30, 2003, Publisher: Vitroco Materials Technology.

Fuji, N., "Thermal Insulating Paint" (Abstract Only—referencing CN 101381546 A), Mar. 11, 2009, vol. Week 200972, Publisher: Thomson Scientific (obtained from Database WPI; AN 2009-G45501; publication No. XP-002660286), Published in: London, GB.

* cited by examiner

STRUCTURALLY ENHANCED PLASTICS WITH REINFORCEMENTS

CROSS REFERENCE TO RELATED APPLICATIONS

This application is a Continuation of U.S. patent application Ser. No. 13/757,322, entitled, "STRUCTURALLY ENHANCED PLASTICS WITH FILLER REINFORCEMENTS," filed Feb. 1, 2013, which is a Divisional of U.S. patent application Ser. No. 12/572,942, entitled "STRUCTURALLY ENHANCED POLYMER WITH FILLER REINFORCEMENTS," filed Oct. 2, 2009, which is a Continuation-in-Part of U.S. patent application Ser. No. 12/412,357, entitled "STRUCTURALLY ENHANCED PLASTICS WITH FILLER REINFORCEMENTS," filed Mar. 26, 2009, both of which claim priority to U.S. Provisional Patent Application No. 61/070,876 entitled "STRUCTURALLY ENHANCED POLYMER WITH FILLER REINFORCEMENTS," filed Mar. 26, 2008, the contents of each which are hereby incorporated by reference.

FIELD OF THE INVENTION

A composition for promoting kinetic mixing of additives within a non-linear viscosity zone of a fluid such as a thermoplastic material.

BACKGROUND OF THE INVENTION

An extrusion process is one of the most economic methods of manufacturing to produce engineering structural materials. Typically, an extrusion process is used to manufacture lengths of extruded members having a uniform cross-section. The cross-section of the members may be of various simple shapes such as circular, annular, or rectangular. The cross-section of the members may also be very complex, including internal support structures and/or having an irregular periphery.

Typically, an extrusion process utilizes thermoplastic polymer compounds that are introduced into a feed hopper, Thermoplastic polymer compounds can be in powder, liquid, cubed, palletized and/or any other extrudable form. The thermoplastic polymer can be virgin, recycled, or a mixture of both. An example of a typical extruder is shown in FIG. 1.

The plastic industry has used fillers to lower resin costs during manufacturing. Typical fillers include calcium carbonate, talc, wood fiber, and a variety of others. In addition to providing a cost savings, adding fillers to plastics reduces the coefficient of thermal expansion, increases mechanical strength, and in some cases lowers the density.

Calcium carbonate and talc have no structural strength or fiber orientation to improve structural stability. Talc is bonded together by weak Van der Waal's forces, which allow the material to cleave again and again when pressure is applied to its surface. Even though test results indicate that talc imparts a variety of benefits to polymers, for instance higher stiffness and improved dimensional stability, talc acts like a micro-filler with lubricating properties.

Calcium carbonate has similar properties, but has a water absorption problem, which limits its application because of environmental degradation. Talc avoids this problem since it is hydrophobic.

Wood fiber adds some dimensional stability because of the fiber characteristics interaction with the plastic but wood fiber also suffers from environmental degradation. All three of these common fillers are economically feasible but are structurally limited.

Research efforts have focused on farm waste fibers such as rice hulls, sugar cane fiber, wheat straw and a variety of other fibers to be used as low-cost fillers inside plastics. The use of wood fiber as a filler presents similar difficulties to the above-referenced farm waste fibers.

There are three types of commonly used mixing principles:
1. Static mixing: liquids flowing around fixed objects either by force produced flow by pressure through mechanical means or gravity induced flow.
2. Dynamic mixing: liquid induced mixing by mechanical agitation with typical impellers, i.e., impellers and wiping blade and sheer designs as well as dual or single screw agitation designs.
3. Kinetic mixing: liquid is mixed by velocity impacts on a surface or impacts of two or more liquids impinging on each other.

All three of the above mixing methods have one thing in common that hinders the optimizing of mixing regardless of the fluid being combined and regardless of whether the materials being mixed are polar, nonpolar, organic or inorganic etc. or if it is a filled material with compressible or non-compressible fillers.

All incompressible fluids have a wall effect or a boundary layer effect where the fluid velocity is greatly reduced at the wall or mechanical interface. Static mixing systems use this boundary layer to fold or blend the liquid using this resistive force to promote agitation.

Dynamic mixing, regardless of the geometry of mixing blades or turbine, results in dead zones and incomplete mixing because of the boundary layer. Dynamic mixing uses high shear and a screw blade designed to use the boundary layer to promote friction and compression by centrifugal forces to accomplish agitation while maintaining an incomplete mixed boundary layer on mechanical surfaces.

Kinetic mixing suffers from boundary layer effects on velocity profiles both on the incoming streams and at the injector tip. However, this system suffers minimal effects of boundary layer except for transport fluid phenomena.

A further explanation of the boundary layer follows. Aerodynamic forces depend in a complex way on the viscosity of the fluid. As the fluid moves past the object, the molecules right next to the surface stick to the surface. The molecules just above the surface are slowed down in their collisions with the molecules sticking to the surface. These molecules in turn slow down the flow just above them. The farther one moves away from the surface, the fewer the collisions affected by the object surface. This creates a thin layer of fluid near the surface in which the velocity changes from zero at the surface to the free stream value away from the surface. Engineers call this layer the boundary layer because it occurs on the boundary of the fluid.

As an object moves through a fluid, or as a fluid moves past an object, the molecules of the fluid near the object are disturbed and move around the object. Aerodynamic forces are generated between the fluid and the object. The magnitude of these forces depend on the shape of the object, the speed of the object, the mass of the fluid going by the object and on two other important properties of the fluid; the viscosity, or stickiness, and the compressibility, or springiness, of the fluid. To properly model these effects, aerospace engineers use similarity parameters which are ratios of these effects to other forces present in the problem. If two experiments have the same values for the similarity parameters, then the relative importance of the forces are being correctly modeled.

FIG. 2A shows the streamwise velocity variation from free stream to the surface. In reality, the effects are three dimensional. From the conservation of mass in three dimensions, a change in velocity in the streamwise direction causes a change in velocity in the other directions as well. There is a small component of velocity perpendicular to the surface which displaces or moves the flow above it. One can define the thickness of the boundary layer to be the amount of this displacement. The displacement thickness depends on the Reynolds number, which is the ratio of inertial (resistant to change or motion) forces to viscous (heavy and gluey) forces and is given by the equation: Reynolds number (Re) equals velocity (V) times density (r) times a characteristic length (l) divided by the viscosity coefficient (mu), i.e., $Re=V*r*l/mu$.

As can be seen in FIG. 2A, boundary layers may be either laminar (layered), or turbulent (disordered) depending on the value of the Reynolds number. For lower Reynolds numbers, the boundary layer is laminar and the streamwise velocity changes uniformly as one moves away from the wall, as shown on the left side of FIG. 2A. For higher Reynolds numbers, the boundary layer is turbulent and the streamwise velocity is characterized by unsteady (changing with time) swirling flows inside the boundary layer. The external flow reacts to the edge of the boundary layer just as it would to the physical surface of an object. So the boundary layer gives any object an "effective" shape which is usually slightly different from the physical shape. The boundary layer may lift off or "separate" from the body and create an effective shape much different from the physical shape. This happens because the flow in the boundary has very low energy (relative to the free stream) and is more easily driven by changes in pressure. Flow separation is the reason for airplane wing stall at high angle of attack. The effects of the boundary layer on lift are contained in the lift coefficient and the effects on drag are contained in the drag coefficient.

Boundary-Layer Flow

That portion of a fluid flow, near a solid surface, is where shear stresses are significant and inviscid-flow assumption may not be used. All solid surfaces interact with a viscous fluid flow because of the no-slip condition, a physical requirement that the fluid and solid have equal velocities at their interface. Thus, a fluid flow is retarded by a fixed solid surface, and a finite, slow-moving boundary layer is formed. A requirement for the boundary layer to be thin is that the Reynolds number of the body be large, $10^3$ or more. Under these conditions the flow outside the boundary layer is essentially inviscid and plays the role of a driving mechanism for the layer.

Referring now to FIG. 2B, a typical low-speed or laminar boundary layer is shown in the illustration. Such a display of the streamwise flow vector variation near the wall is called a velocity profile. The no-slip condition requires that $u(x,0)=0$, as shown, where u is the velocity of flow in the boundary layer. The velocity rises monotonically with distance y from the wall, finally merging smoothly with the outer (inviscid) stream velocity $U(x)$. At any point in the boundary layer, the fluid shear stress $\tau$, is proportional to the local velocity gradient, assuming a Newtonian fluid. The value of the shear stress at the wall is most important, since it relates not only to the drag of the body but often also to its heat transfer. At the edge of the boundary layer, $\tau$ approaches zero asymptotically. There is no exact spot where $\tau=0$, therefore the thickness $\delta$ of a boundary layer is usually defined arbitrarily as the point where $u=0.99 U$.

SUMMARY OF THE INVENTION

This patent focuses on technology breakthroughs in boundary layer mixing, i.e., on the effects of structural mechanical fillers with particle sizes ranging from nano to micron using the static film principal of the boundary layer coupled with the coefficient of friction upon a particle being forced to rotate or tumble in the boundary layer because of fluid velocity differentials thereby promoting kinetic mixing through the use of the structural fillers.

As an example, a hard sphere rolling on a soft material travels in a moving depression. The material is compressed in front and rebounds at the rear and where the material is perfectly elastic, the energy stored in compression is returned to the sphere at its rear. Actual materials are not perfectly elastic, however, so energy dissipation occurs, the result being kinetic energy, i.e., rolling. By definition, a fluid is a material continuum that is unable to withstand a static shear stress, unlike an elastic solid, which responds to a shear stress with a recoverable deformation, a fluid responds with an irrecoverable flow. The irrecoverable flow may be used as a driving force for kinetic mechanical mixing in the boundary layer. By using the principle of rolling, kinetic friction and the increased fluid sticking at the surface of the no-slip zone produces adherents while the velocity adjacent to the boundary layer produces an inertial force upon the particle. The inertial force rotates the particle along the surface of mechanical process equipment regardless of mixing mechanics used, i.e., static, dynamic or kinetic.

Structural filler particle geometry is based on the fundamental principle of surface roughness, promoting increased adherence to the zero velocity zone in the boundary layer. The boundary layer is where the material has its strongest adhesion force or stickiness present. By using a particle that has a rough and/or sharp particle surface, the adhesion to the non-slip zone is increased, which promotes better surface adhesion than a smooth particle with little to no surface characteristics. The ideal filler particle size will differ between polymers because viscosity differs as well as mixing mechanics produced by sheer forces and surface polishing in mechanical surfaces, which creates a variation in boundary layer thickness. A rough and/or sharp particle surface allows the particle to function as a rolling kinetic mixing blade in the boundary layer. The technology breakthrough embodied in this patent focuses on a hardened particle with sharpened edges rolling along the boundary layer producing micro mixing with agitation over the surface area in which the boundary layer exist.

Advantages of this technology include:

- Cost savings through the replacement of expensive polymers with inexpensive structural material.
- Cost savings by increasing the ability to incorporate more organic material into plastic.
- Cost savings by increasing productivity with high levels of organic and/or structural materials.
- Better disbursement of additives and or fillers through increased mixing on the large mechanical surfaces produced by the boundary mixing.
- Better mixing of polymers by grinding and cutting effects of the particles rolling along the large surface area as the velocity and compression of the polymers impact the surface during normal mixing operations.
- Reduction of coefficient of friction on mechanical surfaces caused by boundary layer effects with drag which is replaced by rolling kinetic friction of a hard particle in the boundary layers.
- Increased production of plastic manufacturing by reduction of the coefficient of friction in the boundary layer for extruded, blown or injection molding processes where the coefficient of friction directly affects the production output.

Surface quality improvement on plastics with or without fillers due to the polish affects caused by kinetic mixing in the boundary layer on all mechanical surfaces including dyes, molds and etc. that the materials flow in and around during the finishing process.

Promotion of boundary layer removal by kinetic mixing thereby having the property of self-cleaning of the boundary layer.

Enhanced heat transfer due to kinetic mixing in the boundary layer which is considered to be a stagnant film where the heat transfer is dominantly conduction but the mixing of the stag film produces forced convection at the heat transfer surface.

Solid particles used for kinetic mixing in boundary layer need to have following characteristics:

The physical geometry of particles should have a characteristic that allows the particle the ability to roll or tumble along the boundary layer surface.

The mixing efficiency of particles increases with surface roughness to interact with zero velocity zone or non-slip polymer surface to promote kinetic friction rather than static friction.

Particles should be sufficiently hard so that the fluid is deformed around particle for promoting kinetic mixing through the tumbling or rolling effect of the particle.

Particles should be size proportional to the boundary layer of materials being used so that the particles roll or tumble using kinetic rolling friction so that the particles are not drug within the boundary layer, which increases the negative effects of the boundary layer based on increased surface roughness restricting flow or can produce the removal of the particle out of the boundary layer into the bulk fluid.
- Particles should be able to reconnect in the boundary layer from the bulk fluid during the mixing process based on particle size and surface roughness.
- Particles can be solid or porous materials, manmade or naturally occurring minerals and or rocks.

Physical Geometry of Particles:

Spherical particles are not ideal because of the following two phenomena that take place simultaneously. The first phenomenon relates to the surface friction of the particle in the non-slip zone and the second relates to the driving force applied to the particle by fluid velocity, which affects the ability of the particle to induce mixing through a tumbling of an irregular shape where a spherical shape tends to just roll along the boundary line. The driving force is produced by fluid flow on the upper half of the boundary layer. Particle shapes can be spherical, triangular, diamond, square or etc., but semi-flat or flat objects are less desirable because they do not tumble well. Semi-flat or flat objects tumble less well because the cross-sectional surface area has little resistance to fluid friction applied to its thickness. However, since agitation in the form of mixing is desired, awkward forms of tumbling are beneficial since the awkward tumbling creates dynamic random generating mixing zones. These random mixing zones are analogous to having big mixing blades operating with little mixing blades. Some turn fast and some turn slow, but the end result is that they are all mixing. In a more viscous material, which has less inelastic properties, the kinetic mixing by the particles will produce a chopping and grinding effect due to surface roughness and sharp edges of the particles.

Typical extruded, as well as injection molding plastics are PP, PE, PB HDPP, HDPE, HDPB, Nylon, ABS and PVC, which are some of the types of plastics used in industry, in which the hardness is proportional to the material properties of the plastic. By adding hard fillers into the plastic, a tougher more durable plastic may be reformulated that is more scratch and/or mar resistant than the inherent physical properties of the plastic. Common fillers are calcium carbonate and talc, each having a Mohs hardness scale rating of between one in two. However, it is desirable to use structural fillers having a hardness of at least 2.5.

A variety of environmentally stable materials suitable for use as hard structural fillers have not been commercially evaluated by the plastic manufacturing industry. These fillers are structural, they are hard, light weight and environmentally stable. Some of the reasons why these fillers have not been used commercially is that they are difficult to formulate and handle. Additionally, these materials may not be as economically feasible as previously used fillers. The following lightweight structural fillers are similar in hardness, density and particle sizes in the micron range but have not been widely accepted for use in the plastics industry.

Glass or ceramic micro spheres have been commercially available for decades. The spheres have had some success in plastic manufacturing but they have been used mainly in the coatings, adhesives and composite market.

Perlite is a naturally occurring silicous rock used mainly in construction products, an insulator for masonry, lightweight concrete and for food additives.

Sodium potassium aluminum silicate (volcanic glass) is a micron powder used as a plastic flow modifier to improve the output as well as to produce enhanced mixing properties for additives as a surface tension modifier in the linear viscosity zone.

The structural fillers that have been previously mentioned have a Mohs scale hardness of 5.5, which is equal to window glass, sand and a good quality steel knife blade.

These structural fillers are not held together by weak forces. Therefore, they keep their rigid shape and do not have lubricating properties associated with cleaving of weak chemical bonds between molecular layers, such as may be seen with talc. Particles having a Mohs scale hardness of 5.5 are as hard as what normally would damage the plastic surface. Therefore, resistance to scratching and/or marring by the sheer hardness of the filler incorporated into the plastic formulation is improved. The structural fillers are preferably lightweight, having a density in the ranges of 0.18 g/cm$^3$ and higher, whereas talc and calcium carbonate have densities ranging 2.50-2.80 g/cm$^3$. Therefore, hard structural fillers can reduce the density of the plastic formula.

Micro spheres have recently become of interest for use with extruded plastics because of their improved strength, which allows them to withstand mechanical pressures without being crushed. As the strength of the micro spheres increases, the manufacture cost decreases, which makes micro spheres an ideal structural filler material for plastics.

Other filler materials for consideration include expanded Perlite. Expanded Perlite has not been commercially used by the plastic industry in extrusion processes because of its micro bubbles and tubes that are natural properties of the material and can not withstand the extrusion pressures without crushing. The crushing effect of the fillers adds to the inconsistency volume flow, which affects the dimensional stability of the extruded product, which may or may not be acceptable depending on the application. For this reason, Perlite has not reached commercial viability as structural filler in the plastics field. Perlite can be finely milled, which greatly improves the crush strength of the product, thereby allowing the material the ability to withstand mechanical extrusion pressures process, thereby gaining dimensional stability. One reason this material has not been adopted as a filler is that the material in its original form has the ability to crush under pressure.

Finely milled Perlite has the same physical properties, just a finer mesh, which will withstand higher pressures.

DETAILED DESCRIPTION OF THE PREFERRED EMBODIMENTS

Figure 1:
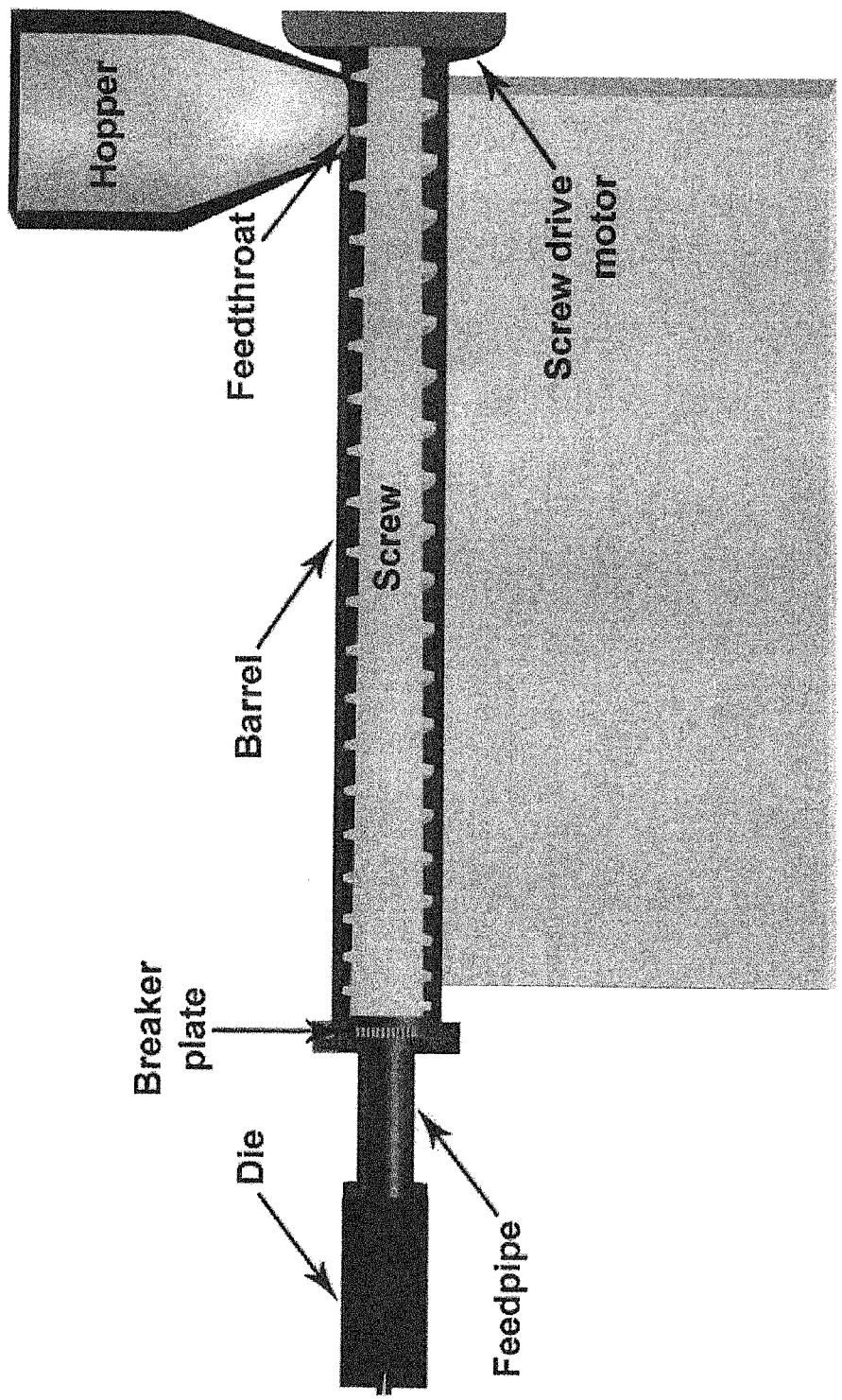
FIG. 1 is a diagram of an extruder.
Figure 2A:
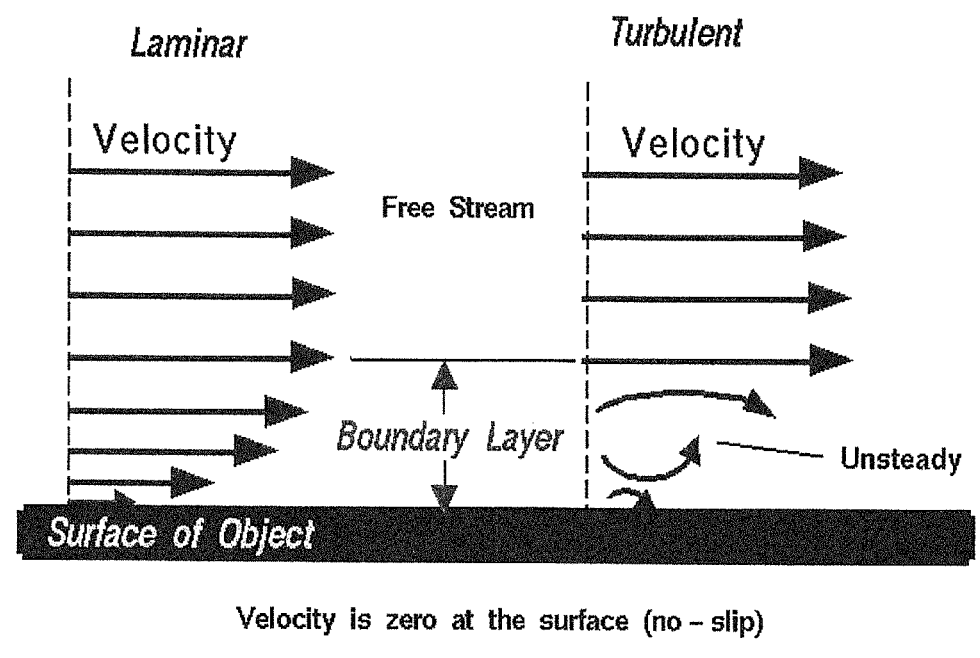
FIG. 2A is a graphical explanation of boundary layer concepts.
Figure 2B:
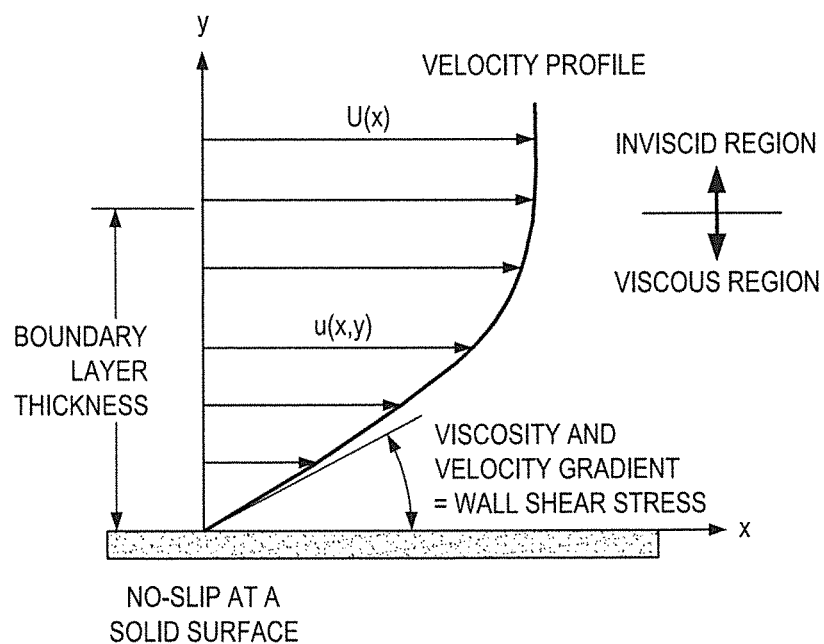
FIG. 2B is a graphical explanation of a low speed or laminar boundary layer.

During a jet mill process, particles strike each other to form a sharp edge via a conchoidal fracture. Even though some particle size selections will produce different effects with differing polymer selections, it is this edge effect that produces their performance. The edge effect on hard structural particles facilitates the incorporation of fillers, structural fillers, pigments, fibers and a variety of other materials into thermoplastics and polymer material.

Materials that will produce sharp edge effects upon jet milling include: pumice, Perlite, volcanic glass, sand, flint, slate and granite in a variety of other mineable materials. There are a variety of man-made materials, such as steel, aluminum, brass, ceramics and recycled and/or new window glass, that can be processed either by jet milling or other related milling processes to produce a sharp edge with small particle sizes. In addition to the listed examples, other materials may also be suitable, provided the materials have sufficient hardness, estimated to be 2.5 on the Mohs hardness scale.

It is clear to see by the Mohs hardness scale that there is a variety of materials that are harder than 2.5 that would work as likely candidates to produce sharpened edge effects, thereby working as kinetic mixing particles relating to the boundary layer as well as a structural filler to be incorporated in today's modern plastics, polymers, paints and adhesives. The Mohs scale is presented below.

| Hardness | Mineral | Absolute Hardness |
|---|---|---|
| 1 | Talc ($Mg_3Si_4O_{10}(OH)_2$) | 1 |
| 2 | Gypsum ($CaSO_4.2H_2O$) | 2 |
| 3 | Calcite ($CaCO_3$) | 9 |
| 4 | Fluorite ($CaF_2$) | 21 |
| 5 | Apatite ($Cas(PO_4)_3(OH-,Cl-,F-)$) | 48 |
| 6 | Orthoclase Feldspar ($KA1Si308$) | 72 |
| 7 | Quartz ($SiO_2$) | 100 |
| 8 | Topaz ($Al_2SiO_4(OH-Y-)_2$) | 200 |
| 9 | Corundum ($Al_2O_3$) | 400 |
| 10 | Diamond (C) | 1500 |

The Mohs scale is a purely ordinal scale. For example, corundum (9) is twice as hard as topaz (8), but diamond (10) is almost four times as hard as corundum. The table below shows comparison with absolute hardness measured by a sclerometer.

On the Mohs scale, a pencil lead has a hardness of 1; a fingernail has hardness 2.5; a copper penny, about 3.5; a knife blade, 5.5; window glass, 5.5; steel file, 6.5.[1] Using these ordinary materials of known hardness can be a simple way to approximate the position of a mineral on the scale.

| Hardness | Substance or Mineral |
|---|---|
| 1 | Talc |
| 2 | Gypsum |
| 2.5 to 3 | Pure gold, silver, aluminum |
| 3 | Calcite, copper penny |
| 4 | Fluorite |
| 4 to 4.5 | Platinum |
| 4 to 5 | Iron |
| 5 | Apatite |
| 6 | Orthoclase |
| 6 | Titanium |
| 6.5 | Iron pyrite |
| 6 to 7 | Glass, vitreous pure silica |
| 7 | Quartz |
| 7 to 7.5 | Garnet |
| 7 to 8 | Hardened steel |
| 8 | Topaz |
| 9 | Corundum |
| 9 to 9.5 | Carborundum |
| 10 | Diamond |
| >10 | Ultrahard fullerite |
| >10 | Aggregated diamond nanorods |

Mineral processing technologies have been around for centuries and are highly specialized. They have the ability to separate particles by multiple methods as well as shape them into smaller particles. In the case of these highly specialized solids or porous materials to produce the desired three-dimensional blade like characteristics with sharpened edges in an aspect ratio greater than 0.7 the material must be an impact jet milled or jet milled process. Impact jet milling is a process where the process material at high velocity hits a hardened surface to produce a shattering effect of particles. In jet milling, opposing jets cause the process material to impact upon itself to produce a shattering effect, i.e., conchoidal fractures on the material. The efficiency of the kinetic mixing particle due to the resulting with surface sharpness, i.e., bladelike edges (see Appendix 1).

A ball mill process tumbles the material in a batch process removing an desired surface characteristic, e.g., sharpness. For use as particles in thermoplastic extrusions, solid minerals or rocks should be refined to particles of 10 to 20 mesh or smaller. This is the typical starting point for feeding material into the impact jet milled or jet milled process. This can be accomplished by a variety of methods that are commonly available and known by the industry to produce desired particle sizes. The preferred mineral or rock should be able to produce conchoidal fracture. This ensures knifelike edge effects with three-dimensional shapes. Refer to Appendix 1 for images of conchoidal fractures. In the case of porous minerals or rocks, the characteristics of the pores being smashed and shattering upon impact during the impact jet or jet milling process creates the three-dimensional knifelike edge shaped particles. Even though rough and uneven surfaces may be sufficient in some mixing applications, in this case, the sharper the particle the better the results. Refer to Appendix 1 for reference particle sizes after jet milling. Man-made materials such as glass, ceramics and metals as well as a variety of other types of materials meeting the minimum hardness of 2.5 by the Mohs scale that produce sharp edges with a three-dimensional shape and an aspect ratio larger than 0.7 can be used. The impact jet or jet milling process typically with these materials produce particles with a mean average of 5-60 µm with a single pass. Man-made materials like glass may be processed into the desired three-dimensional sharp edged particles with an aspect ratio of 0.7 and higher by means of a mechanical roller mill smashing the particles rather than jet milling. This is clearly illustrated in the pictures of Appendices of the raw feed small glass particles before jet milling.

Particle Surface Characteristics:

The mixing efficiency of a particle is increased when surface dynamic characteristics of the particle are increased. Examples of particle surface dynamic characteristics include characteristics such as colloidal fracture that produce sharp bladelike edges, smooth surfaces, roughness or surface morphology, three-dimensional needlelike shape and thin curved surfaces. Increasing surface dynamic characteristics has a twofold effect. The first effect is that surface characteristics and particle geometry of a particle having increased surface dynamic characteristics enhance surface adhesion to the nonslip zone or the sticky or gluey region, which produces resistance to rolling or tumbling of the particle. The second effect of increasing surface dynamic characteristics is an increased resistance of the ability of the particle to roll and tumble, which results in stronger mechanical interaction with the impacting fluid. In the example of a smooth spherical ball rolling across a surface, interaction adhesion with a nonslip zone is minimal and the effects on the polymer do not produce much dynamic mixing. If the material dynamic surface characteristics are increased, the dynamic mixing is increased thereby increasing cohesion forces in the sticky/gluey region, then increased rotational resistance is promoted, which increases the cutting or chopping effects of the sharp bladelike particles' ability to grind and cut during tumbling or rotation, which produces kinetic boundary layer mixing.

Examples of desired characteristics for a particle to interact in the boundary layer to promote kinetic mixing are shown in electron microscope images found in the below referenced appendices.

Images showing particles exhibiting fracture:
Appendix 1. Ash image is: 7, 8 and 9; and
Appendix 3. Expanded Perlite Images: 3, 4 and 5, Recycled Glass Images: 6 through 12.

Even though a variety of materials have the ability to fracture during milling processes, the images of Appendix 1 and Appendix 3, mentioned immediately above, show the characteristics of colloidal fractures that produce sharp edges.

Images showing particles having sharp bladelike edges:
Appendix 1. Ash images: 7, 8 and 9; and
Appendix 3. Expanded Perlite Images: 3, 4 and 5; Recycled Glass Images: 6 through 12.

A variety of materials have the ability to fracture. For example, striated or vitreous minerals propagate fracture on striation lines, which limits their ability to produce sharp bladelike characteristics. As an example, minerals such as flint and obsidian do not fracture along striation lines. As a result, historically these minerals have been useful for making objects with sharp edges, e.g., arrowheads, spearheads, knives and even axes. The images of Appendix 1 and Appendix 3, referenced immediately above, show this characteristic of sharp knife blade-like surface characteristics.

Images showing particles having smooth edges:
Appendix 1. Ash images: 7, 8 and 9; and
Appendix 3. Expanded Perlite Images: 3, 4 and 5; Recycled Glass Images: 6 through 12.

Smooth edges on a knife blade lowers the resistance needed to cut as well as lowering resistance to the force needed to be applied to the holding device. This is the same principle that is imparted in sharp smooth edges of particles, which allow kinetic mixing to take place while remaining in the boundary layer tumbling or rolling along the sticky or gluey region. If the surface of a particle is sharp and rough, the resistance due to the surface roughness would be enough to remove the particle from the boundary layer by overcoming the cohesive forces produced by the sticky or gluey region. This is why particles having the ability to produce sharp smooth bladelike characteristics can remain in the boundary layer to promote kinetic mixing, as shown in the images of Appendix 1 and Appendix 3, discussed immediately above, that show this characteristic used for kinetic mixing in the boundary layer.

Images showing particles having complex surface geometry:

Appendix 1. Ash images: 7, 8 and 9; and

Appendix 3. Expanded Perlite Images: 3, 4 and 5; Recycled Glass Images: 6 through 12.

The complex shapes that are illustrated by the images of Appendix 1 and Appendix 3, referenced immediately above, show bladelike characteristics with dynamic curves to promote surface adhesion in the sticky or gluey region.

The complex three-dimensional surface area of the particle is sufficient to promote tumbling or rolling. The above referenced images that show the ash and the expanded Perlite clearly shows complex surface geometry characteristics used for kinetic mixing in the boundary layer.

Images showing particles having needle-like points and curves:

Appendix 1. Ash images: 7, 8 and 9; and

Appendix 3. Expanded Perlite Images: 3, 4 and 5; Recycled Glass Images: 6 through 12.

The three-dimensional smooth needle-like tips interact by protruding into the moving fluid region adjacent to the boundary layer to promote tumbling or rolling. The smooth needlelike characteristics create enough fluid force to produce rotation while minimizing the cohesive forces applied by the deformation of the fluid flowing around the particle, thereby overcoming aerodynamic lift forces, which are not sufficient to remove the particle from the sticky or gluey region. The images of Appendix 1 and Appendix 3, referenced immediately above, clearly show the embodiment of three-dimensional needlelike characteristics used for kinetic mixing in the boundary layer.

Images showing particles with surface curves:

Appendix 1. Ash images: 7, 8 and 9; and

Appendix 3. Expanded Perlite Images: 3, 4.

The Ash images show a thin smooth curved particle similar to an egg shell. The surface area allows good adhesion to the sticky layer while promoting of dynamic lift on this curved thin particle, which promotes rotation thereby producing kinetic mixing in the boundary layer. The expanded Perlite clearly shows thin curves on a dynamic surface producing kinetic mixing in the boundary layer. The images of Appendix 1 and Appendix 3, referenced immediately above, clearly show the embodiment of thin curved surface characteristics on particles used for kinetic mixing in the boundary layer.

Reactive particle shaping of porous materials:

Appendix 2 Ash unprocessed spheres images: 4-6;

Appendix 1 Ash processed images 7, 8 and 9;

Appendix 4 Course processed expanded Perlite images: 1, 2; and

Appendix 3 Finely processed expanded Perlite images: 3, 4.

These previously mentioned materials because of their unique surface characteristics, Mohs scale hardness of 5.5, thin curved walls, smooth bladelike shape, with three-dimensional surface geometry have the ability under high pressure to change their physical particle size while maintaining dynamic surface characteristics previously mentioned for kinetic boundary layer mixing. For example particles to large can be swept off the boundary layer into the main fluid where they can undergo fracturing produced by high pressure and fluid turbulence reducing their particle size. The appropriate particle sizes after fracturing will migrate towards the boundary layer because of fluid dynamics where they will come in contact with the sticky or gluey region to promote kinetic boundary layer mixing. In conjunction with this example particles sizing may also take place in the boundary layer against mechanical surfaces caused by fluid impacting pressures. The thin smooth walls while undergoing fracturing produce sharp knifelike blade characteristics regardless of fracture point and the hardness of the material helps maintain three-dimensional surface characteristics to promote tumbling or rolling in the boundary layer.

Particle Hardness and Toughness:

Mixing blades and high shear mixing equipment are usually made of hardened steel. Polymers are softer when mechanical agitation is applied during mixing. Since particles added to the polymer are passing through the equipment, the particles need the ability to retain their shape in order to function properly. The chemical interactions between molecules have been tested and organized based on their hardness. A minimal hardness of 2.5 starting with copper on the Mohs scale or harder will be sufficient for a single pass particle to be tough enough for this mixing process.

Filler particles should be sized proportional to the boundary layer region. The size is usually defined arbitrarily as the point where u=0.99 U. Therefore, a particle theoretical starting diameter is the height measured perpendicular to the surface where u=0.99 U. There are many factors that add difficulties in calculating the parameters associated with kinetic mixing in the boundary zone, for example:

1. Filler loading, which produces modified boundary layer interaction.
2. Heat transfer through the walls creating viscosity differentials.
3. Shear effects and continually increased compression induced by screw agitation.
4. Chemical reactions where materials are changing physical properties such as viscosities, density and etc.

The dynamics of mixing is one of the most complex mechanical chemical interactions in the process industry. Particle size will vary from product to product and optimization may or may not be needed.

The chemical industry has produced test methods and tables for homogeneous liquid and the boundary layer relative thicknesses for calculating fluid flow properties useful for mechanical equipment selection and heat transfer properties. The profile assumption may be used as a starting point for the particle size so that the particle will function in the boundary layer to increase mixing.

One approach to selecting a suitable particle size is to determine when a particular particle size creates an adverse boundary layer effect by increasing the drag coefficient. In most processes, this may be identified by monitoring an increase in amp motor draws during the mixing cycle. If the amps increase, then the particle size should be modified in order to overcome increased power consumption.

Another approach is to see if agitation speed can be increased without motor amp draw increasing, which illustrates friction reduction by kinetic mixing in the boundary layer. For example, FIG. 4 shows the throughput of a thermoplastic through an extruder at a given screw rpm. It can be seen that the additive of Perlite at 8 wt % increases the RPMs from 19 to 45 of screw over the base material of the extruder. Due to equipment limitations, the upper rpm as well as the increased throughput limit was not able to be ascertained.

FIG. 3 shows that the additive of sodium potassium aluminum silicate powder (Rheolite 800 powder) to the base material allows the extruder to be run at higher rpm, reaching a maximum at 29, producing increased throughput with the additive working in the linear viscosity zone.

FIG. 5 shows that even when wood content is incrementally increase to 74 wt % with 2 wt % Perlite and 24 wt % plastic mixture, in order to find maximum RPM limitation induced by loading effects could not be reached until 74 wt % wood loading was used, which illustrates superior throughput rates as compared to a 49 wt % wood content without Perlite. This clearly shows the improvement of kinetic mixing in boundary layer where the viscosity is nonlinear.

Particle Re-Combining to the Boundary Layer:

Particles can be selected to re-interact with the boundary layer if they are swept off into the bulk fluid during mixing. All fluid materials flowing through mechanical agitation take the path of least resistance. The velocity profile is affected in agitation by resistive particles to move in a viscous medium. Therefore, particles that produce resistance to fluid flow are usually directed towards the boundary layer so that the fluid can flow more freely. If the particle size is large, it can become bound in fluid suspension because the cohesive forces in the boundary layer are not sufficient enough to resist fluid velocity force being applied to the boundary layer surface, thereby sweeping the particle back into the fluid suspension. Particles with small sizes will recombine naturally in the boundary layer based on cohesion forces caused by surface roughness to promote kinetic mixing even if the particles become temporarily suspended in the bulk fluid flow.

To verify whether the material is actually enhancing mixing, we mixed a light weight compressible material with poor flow properties with high-density polypropylene. The reason this is significant is wood fiber and polypropylene have no chemical attraction and they mixed well with at higher percentage fill levels while increasing throughput of the combined materials illustrated in FIG. 5.

A limiting factor associated with extruding wood plastic composites is "edge effects," which is where the material shows a Christmas tree like effect on the edges. In some cases, this Christmas tree effect is because of improper mixing and resistance of the material which is dragging on the dye exiting the extruder caused by boundary layer effects producing rough edges. It is common in industry to add lubricants in the formulation to overcome this problem. Lubricants allow the material to flow easier over the boundary layer, thereby allowing the throughput to increase by increasing the rpm of the extrusion screws until the edge effects appear, which indicates a maximum throughput of the process material. Test procedures used that same visual appearance as an indicator of the fastest throughput which was controlled by the extruders screw rpm.

Experiment #1

Base formula measured by mass percent 3 wt % lubricant: a zinc stearate and an ethylene bissteramide wax 7 wt % Talc: a Nicron 403 from Rio Tinto 41 wt % Thermooplastic: HDPE with a MFI of 0.5 and a density of 0.953

49 wt %: wood filler: a commercially classified 60-mesh eastern white pine purchased from American Wood fibers The materials were dry blended with a 4' diameter by 1.5' deep drum blender for 5 minutes prior to feeding.

The extruder was a 35 mm conical counter-rotating twin-screw with a 23 L/D.

The process temperature was 320° F., which was constant throughout all runs.

Two other materials were used and added to the base formula to prove concept these inert hard fillers were:

1. Sodium potassium aluminum silicate (volcanic glass), which is a micron powder used as a plastic flow modifier to improve the output as well as to produce enhanced mixing properties for additives. 800 mesh solid material hardness 5.5 Mohs scale hardness (Rheolite 800 powder); and 2. Expanded Perlite is a naturally occurring silicous rock used mainly in construction products, an insulator for masonry, light weight concrete and for food additives. 500 mesh porous material hardness 5.5 Mohs scale.

Experiment #2

Effects of Sodium potassium aluminum silicate (Rheolite 800 powder) on throughput.

Baseline material maximum throughput before edge effects appeared rpm 19=13.13 in.

Maximum throughput before edge effects using sodium potassium aluminum powder 0.5 wt %, 22 rpm=15.75 in. an overall increase of throughput 19.9% or approximately 20%

1 wt %, 23 rpm=15.75 in. and an overall increase of throughput 20.2%

1 wt %, 27 rpm=18.375 in. and an overall increase of throughput 39.9%

1 wt %, 29 rpm=19.50 in. and an overall increase of throughput 49.6%

Figure 3:
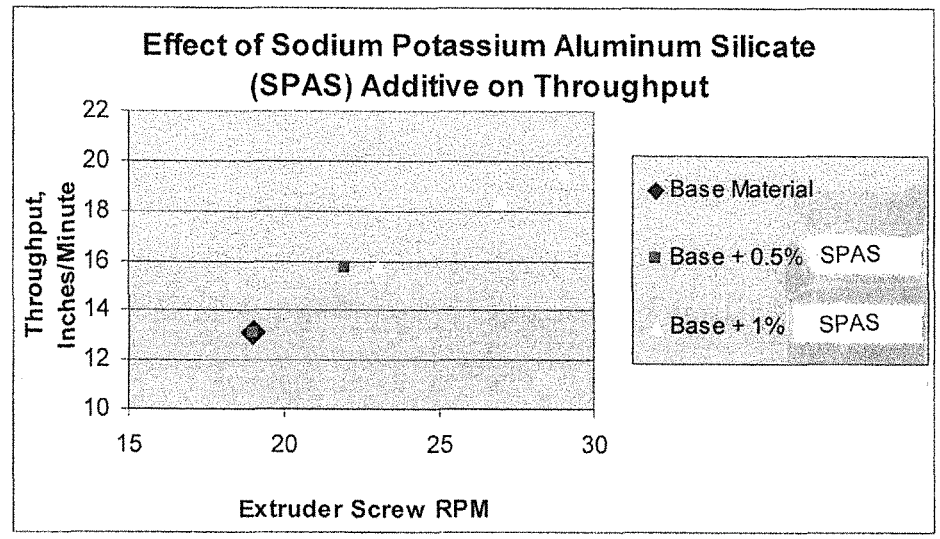
FIG. 3 is a graph showing the effect of Sodium potassium aluminum silicate (Rheolite 800 powder) additive on throughput of thermoplastic through an extruder.

The graphical results of Experiment #2 may be found in FIG. 3

Experiment #3

Effects of Perlite on throughput

Perlite: 8 wt %, rpm 45=21.13 in. an overall increase of throughput 60.9%

Perlite: 16 wt %, rpm 45=19.00 in. an overall increase of throughput 44.8%

Perlite: 25 wt %, rpm 45=15.25 in. an overall increase of throughput 16.2%

Perlite: 33 wt %, rpm 45=13.375 in. an overall increase of throughput 19.0%

Figure 4:
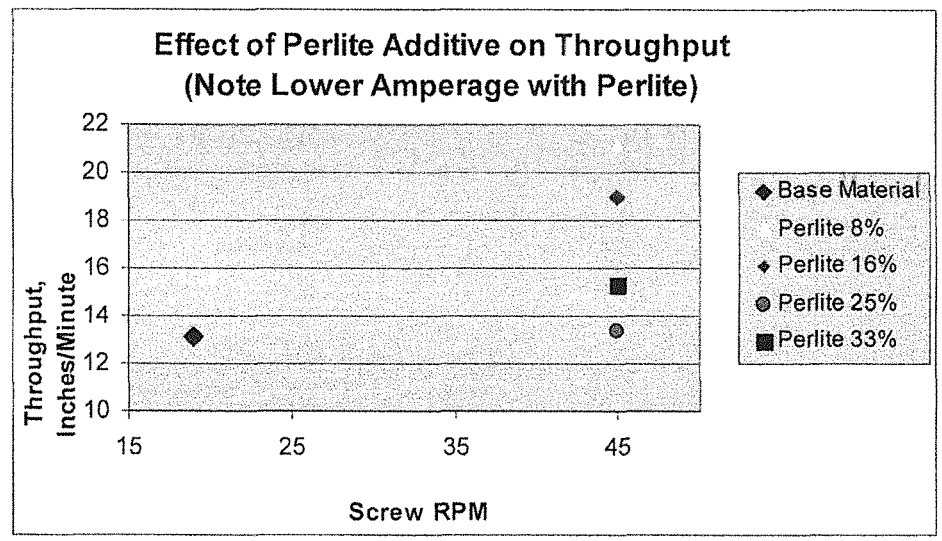
FIG. 4 is a graph showing the effect of increasing loading using Perlite additive on throughput of thermoplastic through an extruder.

The graphical results of Experiment #3 may be found in FIG. 4.

The reason the high percentages of Perlite were chosen was to remove the possibility that this material was just a filler. The edge effects of the three-dimensional knife blades particles interacting with the boundary layer even at 33 wt % still showed an improvement of 19% greater than the base material. Throughputs of the material could have been higher but the rpms limitation on the extruder was 45 and the material was being hand fed that is why we believe at 25% the throughput decreased because of difficulties in feeding such a lightweight material for the first time but by the time we got to 33 wt % we had figured it out.

Experiment #4

Effects of wood on throughput

Baseline material maximum throughput before edge effects appeared rpm 25=17.68 in.

Concentration of Perlite was held constant at the starting point of 2 wt %

Wood: 52 wt %, rpm 45=27.6 in. an overall increase of throughput 56.1%

Wood: 59 wt %, rpm 45=26.25 in. an overall increase of throughput 48.5%

Wood: 64 wt %, rpm 45=24.17 in. an overall increase of throughput 36.7%

Wood: 69 wt %, rpm 45=24.33 in. an overall increase of throughput 37.6%

Wood: 74 wt %, rpm 30=22.25 in. overall increase of throughput 25.8%

Figure 5:
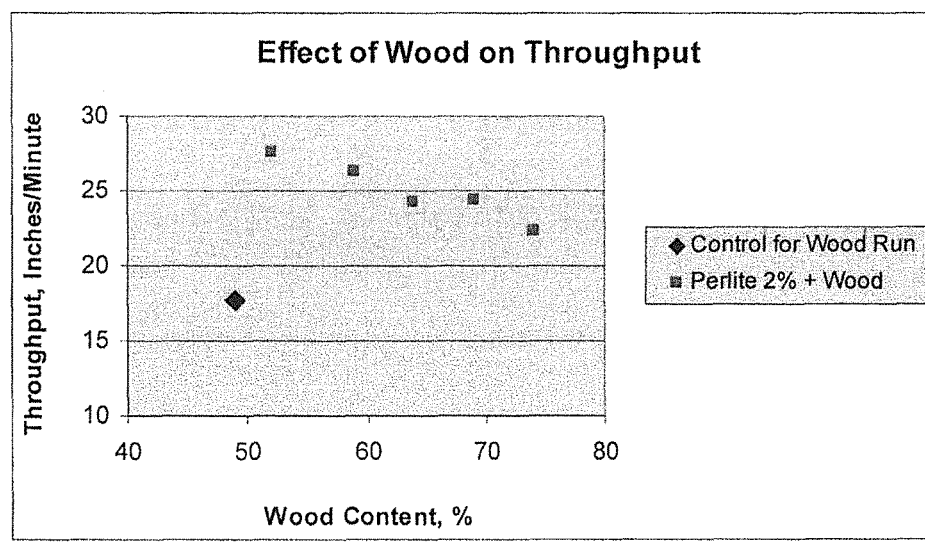
FIG. 5 is a graph showing the effect of increasing loading of wood particles while maintaining a 2 wt % Perlite additive loading on throughput of thermoplastic through an extruder.

The graphical results of Experiment #4 may be found in FIG. 5

The reason this test was chosen was because the loading of a lightweight natural organic filler into an organic petroleum based material increased, the edge effects of poor mixing. There was no maximum throughput reached on 52 wt %, 59 wt %, 64 wt % and 69 wt % because the rpm were at a maximum until 74 wt % at which time the rpm had to be decreased to 30 rpms to prevent edge effects. The compressible fibers in the extrusion process act like broom sweeps along the boundary layer. The wood fiber is a compressible filler whose density goes from 0.4 g/cm$^3$ to 1.2 g/cm$^3$ after extrusion against the wall which have the ability to encapsulate these hard particles in the boundary layer and remove them permanently. It is the effect of the three-dimensional particle shape that holds them in the boundary layer with blades that allow this material to cut softer material and not imbed in the wood fiber, preventing them from being swept away even when the wood fiber is undergoing compression in extrusion process.

There was verification that this material operates in the boundary layer and is self-cleaning. The first day of trial runs we ran the materials in the order shown by the graphs. The second day of the trial run before the wood filler experiment under the same conditions, materials and weather the baseline material had a significant increase of throughput.

Day one, baseline material maximum throughput before edge effects appeared: rpm 19=13.13 in.

Day two, baseline material maximum throughput before edge effects appeared: rpm 25=17.68 in. with an overall increase of 34.6%.

This was caused by the equipment being polished inside with the high concentrations of Perlite from day one proving itself cleaning the boundary layer. It implies that the material's three-dimensional size and shape with sharpened blade like edges provide excellent kinetic rolling capabilities even if the boundary layers thickness changes slightly due to surface cleaning/polishing because of the surface and continuous compression forces in the dynamic mixing of the extrusion process.

The boundary layer kinetic mixing particles can be introduced throughout industry in a variety of ways. For example, in the plastics market:

The particles can be incorporated into pelletized form from the plastics manufacturer and marketed as a production increasing plastic.

The particles can be incorporated into colored pellets by pigment suppliers and marketed as rapid dispersing palletized pigment.

The particles can be incorporated as palletized with filler inorganic or organic and marketed as self wetting filler.

The particles can be incorporated into dry powders and marketed as self wetting powders such as fire retardants, fungicides and fillers etc.

The particles can be incorporated into liquids as a disbursement for liquid pigments, plasticizers, UV stabilizer, blowing agents and lubricants etc.

The boundary layer kinetic mixing particles can be utilized by the paint industry:

The particles can be incorporated into paint to increase dispersion properties of pigments, plasticizers, fungicides, UV stabilizers, fire retardants, etc.

The particles can be incorporated into pigments at custom mixing stations found in paint stores to help dispense less material and produce the same color through better mixing and dispersion property mixing.

The particles can be incorporated into dry powders from additives manufacturers to help disperse fire retardants, fillers etc.

The particles can be incorporated into spray cans to increase the mixing along the walls promoting boundary layer mixing.

The particles can be incorporated into two component mixing materials to promote better surface area mixing or boundary layer and liquid to liquid interface boundary layer mixing urethanes, urea and epoxies etc.

The particles can be incorporated into a lubricant package used for cleaning spray equipment through continuous recirculation with chemical cleaners.

The boundary layer kinetic mixing particles can be utilized by the lubrication industry.

The particles can be incorporated into oils to promote better flow around surfaces by lowering the boundary layer friction zone producing better wetting with no break down of temperature on this additive because it's a solid particle: cars, boats, planes, bicycles internal oil external oil, etc.

The particles can be incorporated into oils for whole household cleaning allowing the oil to spread more evenly as a thinner layer less likely to become sticky over time because the layer is thinner.

The particles can be incorporated into break fluids, hydraulic fluids of all types producing a better response to fluid motion because the boundary layer moves with kinetic mobility when pressure is applied.

The particles can be incorporated into fuel additives promotes better disbursement in the fuel as well as a self-cleaning action due to particles interacting on boundary layers throughout the whole entire flow path of combustion including the exhaust where the particles still have a cleaning effect.

The particles can be added as a lubricant and disbursements directly from the refinery. The particles will not only help a car's lubricating effects and cleaning the system but the particles will also increase the lifespan of the gasoline pumps due to residue build up of sludge type material in the boundary layers.

The boundary layer kinetic mixing particles can be utilized to increase flow properties. Most liquid material flowing through a pipe, pump system and/or process equipment undergo boundary layer effects based on drag coefficient regardless of the surface geometry which this technology can reduce drag by promoting kinetic boundary layer mixing, with a self-cleaning effect. This will allow pipes and process equipment to perform at optimum levels.

The boundary layer kinetic mixing particles can be utilized to increase heat transfer. Because the boundary layer is being kinetically moved it is no longer a stagnant fluid heat transfer zone this increases the heat transfer properties on both sides. Now the stagnant boundary layer has turned into forced convection on both sides not just one, the fluid to fluid and the fluid to surface.

The boundary layer kinetic mixing particles can be utilized by the food, pharmaceuticals and agriculture industry. Because the selection of the particles can be approved by food and drug the processing of food through plants into its packaging can be enhanced and process equipment can mix things more thoroughly.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. An improved method of flowing a fluid through equipment where the flowing fluid has a stream velocity (U) and a boundary layer flow velocity (u), wherein the parameters (U) and (u) are affected by filler loading, heat transfer, shear effects and chemical reactions, wherein the method comprises the step of:

defining a particle theoretical starting diameter at a height measured perpendicular to a surface where $u=0.99$ U;

incorporating particles into said fluid, said particles having a sharp conchoidal surface and a complex three dimensional surface area, and said particles having a diameter approximately equal to said theoretical starting diameter.

2. The method according to claim 1 further comprising the step of:

adding a filler to said fluid.

3. The method according to claim 1 further comprising the step of polishing said equipment with said particles that are mixing in a boundary layer of said flowing fluid.

4. The method according to claim 1 wherein said equipment is a pump or process equipment having connections that are open ended single pass or are continuous for recycle operations.

5. The method according to claim 1 wherein said particles comprise greater than 2 wt % of a composition comprised of said fluid and said particles.

6. The method according to claim 1 wherein:

said complex three-dimensional surface area comprises a thin smooth curved shape.

7. The method according to claim 1 wherein:

said complex three-dimensional surface area comprises a smooth, sharp blade-like surface.

8. The method according to claim 1 wherein:

said fluid is a thermoplastic material.

9. The method according to claim 1 further comprising the step of:

jet milling said particles for conchoidally fracturing said particles prior to said step of incorporating said particles into said fluid flowing through the equipment.

10. The method according to claim 1 further comprising the step of:

roller milling said particles for conchoidally fracturing said particles prior to said step of incorporating said particles into said fluid flowing through the equipment.

11. The method according to claim 1 wherein said particles have a Mohs hardness value of greater than 2.5.

12. The method according to claim 1 further comprising the step of:

self-cleaning of mechanical parts of said equipment by continuous interaction of said particles through tumbling during kinetic mixing of said particles in said fluid.

13. The method according to claim 1 wherein:

said particles are selected from a group consisting of: solid materials, porous materials, manmade material, or naturally occurring minerals.

14. The method according to claim 1 wherein said fluid is filled.

15. The method according to claim 1 further comprising:
a step of adding an additive into said fluid.

16. The method according to claim 15 wherein:
said additive is a filler.

17. The method according to claim 15 wherein:
said additive is a pigment.

18. The method according to claim 15 wherein:
said additive is a fiber.

19. The method according to claim 15 wherein:
said particles migrate to a boundary layer of said flowing fluid to promote kinetic mixing of said additives within said fluid, said kinetic mixing taking place in a non-linear viscosity zone.

20. The method according to claim 1 further comprising the step of:
adjusting said diameter of said particles to promote particle interaction in a boundary layer of said flowing fluid to achieve one of an increase in additive dispersion in said fluid, or to increase surface quality of said fluid exiting said equipment.

21. The method according to claim 1 wherein:
said flowing of fluid through equipment comprises impingement mixing.

22. The method according to claim 1 wherein:
flowing said fluid in said equipment and said step of incorporating said particles comprises mixing said fluid by grinding and cutting effects generated by said particles rolling on a surface area of a boundary layer of said flowing fluid;
wherein fluid flow is in continuous contact with a surface of said equipment; and
wherein said particles impact said fluid through kinetic tumbling of said particles created by said fluid flowing over said surface.

23. The method according to claim 1 wherein:
said fluid is between a screw and a barrel of said equipment.

24. The method according to claim 1, wherein said particles are incorporated into said fluid by providing pellets which have said particles contained therein, and forming the fluid from said pellets, said fluid of which has the particles dispersed therein.

25. The method according to claim 1 wherein said fluid is an oil.

26. The method according to claim 1 wherein said fluid is a paint.

27. The method according to claim 1 wherein said fluid is a fire retardant.

28. The method according to claim 1 wherein said fluid is a heat transfer fluid.

29. The method according to claim 1 wherein said particles clean a surface of said equipment during said flowing of fluid through said equipment.

* * * * *